(12) United States Patent (10) Patent No.: US 11,916,503 B2
Yamamoto et al. (45) Date of Patent: Feb. 27, 2024

(54) MOTOR CONTROL DEVICE

(71) Applicant: AISAN KOGYO KABUSHIKI KAISHA, Obu (JP)

(72) Inventors: Hisashi Yamamoto, Gamagori (JP); Yukihiko Yato, Obu (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 51 days.

(21) Appl. No.: 17/641,614

(22) PCT Filed: Jul. 30, 2020

(86) PCT No.: PCT/JP2020/029353
§ 371 (c)(1),
(2) Date: Mar. 9, 2022

(87) PCT Pub. No.: WO2021/059741
PCT Pub. Date: Apr. 1, 2021

(65) Prior Publication Data
US 2022/0329194 A1 Oct. 13, 2022

(30) Foreign Application Priority Data
Sep. 24, 2019 (JP) ................................ 2019-173390

(51) Int. Cl.
*H02P 27/08* (2006.01)
(52) U.S. Cl.
CPC .................................... *H02P 27/08* (2013.01)
(58) Field of Classification Search
CPC .......... H02P 27/00; H02P 27/04; H02P 27/06; H02P 27/08; H02P 27/085; H02P 29/00; H02P 29/032; H02P 29/40; H02P 29/062; H02P 25/00; H02P 25/062; H02P 25/064; H02P 21/00; H02P 21/003;
(Continued)

(56) References Cited

U.S. PATENT DOCUMENTS 10,749,453 B1 * 8/2020 Ooba .................... H02P 6/18

FOREIGN PATENT DOCUMENTS

| JP | 2001-037278 A | 2/2001 |
| JP | 2016-163452 A | 9/2016 |
| JP | 2018-058143 A | 4/2018 |

OTHER PUBLICATIONS

Japan Institute for Promoting Invention and Innovation Technical Report Publication No. 2018-500910 (2018).
(Continued)

*Primary Examiner* — Antony M Paul
(74) *Attorney, Agent, or Firm* — Shumaker, Loop & Kendrick, LLP

(57) ABSTRACT

When the duty command value is less than or equal to a threshold value, the motor control device performs the complementary PWM control, and when the duty command value is greater than the threshold value, it sets, for the first element, a first period in which the first element remains turned on and a second period in which control is performed with a corrected duty cycle to turn off the first element for a longer period, and performs average PWM control of which average duty cycle in a total period of the first and second periods is same as a set duty cycle. The motor control device turns on the second element while the first element is turned off in the second period.

4 Claims, 10 Drawing Sheets

(58) Field of Classification Search
CPC ...... H02P 21/0021; H02P 21/02; H02P 21/14;
H02P 21/18; H02P 21/20; H02P 21/22;
H02P 23/00; H02P 23/03; H02P 23/07;
H02P 23/14; H02P 23/18; H02P 23/28;
H02P 9/032; H02P 7/29; H02P 7/00;
H02P 6/00; H02P 6/005; H02P 6/08;
H02P 6/12; H02P 6/14; H02P 6/15; H02P
6/28; H02P 6/32; H02P 1/00; H02P 1/42;
H02P 1/46
See application file for complete search history.

(56) References Cited

OTHER PUBLICATIONS

International Search Report (ISR) for PCT/JP2020/029353 dated Sep. 29, 2020 (5 pages).
Written Opinion (WO) for PCT/JP2020/029353 dated Sep. 29, 2020 (5 pages).

* cited by examiner

MOTOR CONTROL DEVICE

TECHNICAL FIELD

The present application claims priority based on Japanese patent application No. 2019-173390 filed on Sep. 24, 2019, the entire contents of which are incorporated herein by reference. The disclosure herein discloses art related to a motor control device.

BACKGROUND ART

Japanese Patent Application Publication No. 2018-58143 (hereinbelow termed Patent Document 1) describes a motor driver that drives a motor having a three-phase inverter. The three-phase inverter includes a U-phase transistor pair (transistors UH, UL), a V-phase transistor pair (transistors VH, VL), and a W-phase transistor pair (transistors WH, WL). Each transistor pair is connected to a power supply, and the transistor pairs are connected in parallel to each other. The transistors UH, VH, WH are connected to a high voltage side, and the transistors UL, VL, WL are connected to a low voltage side.

In Patent Document 1, when for example the transistor UH and the transistor VL are turned on, one of the transistor UH and the transistor VL (more specifically, the transistor UH) is switched based on a duty cycle (hereinbelow termed PWM control). Further in Patent Document 1, the transistor UL connected in series to the transistor UH is turned on while the transistor UH is off (hereinbelow termed complementary PWM control). In Patent Document 1, when the duty cycle exceeds a threshold value (that is, when an off-time of the transistor UH is short), the transistor UL is not turned on and the transistor UL is maintained in an off-state. That is, when the duty cycle exceeds the threshold value, only the PWM control is performed and the complementary PWM control is not performed.

SUMMARY

In Patent Document 1, by stopping the complementary PWM control when the duty cycle exceeds the threshold value, the paired elements of the U-phase transistor pair (transistors UH, UL) are prevented from being turned on simultaneously. However, if the complementary PWM control is stopped, heat generation in each transistor increases, and a structure or a device to address this heat generation will be necessary. If the heat generation of the respective transistors can be suppressed, such a structure or a device to address the heat generation can be omitted (or at least be simplified), and a significant advantage can be enjoyed therefrom. The disclosure herein provides art that realizes a motor control driver that may suppress heat generation of transistors constituting an inverter.

A first aspect disclosed herein is a motor control device configured to drive a motor connected to an inverter. The inverter may comprise a plurality of switching element pairs, each of which is constituted of an upper arm element and a lower arm element connected to each other in series, the upper arm element being connected to a high voltage side of a power supply and the lower arm element being connected to a low voltage side of the power supply. This motor control device may be configured to perform PWM control in which a first element that is on-selected for energizing the motor is switched based on a duty cycle, the first element being one of the upper arm element and the lower arm element. Further, the motor control device may determine a duty command value for switching a second element so that the motor control device performs complementary PWM control in which the second element connected in series with the first element is turned on for a predetermined time during an off-period of the first element, and may perform the complementary PWM control when the determined duty command value is less than or equal to a threshold value. Moreover, when the determined duty command value is greater than the threshold value, the motor control device may set a first period and a second period for the first element, the first period being a period in which the first element remains turned on over a plurality of carrier cycles, the second period being a period for performing control with a corrected duty cycle in which the first element is turned off for a period extended by a period during which the first element is not turned off in the first period, and perform average PWM control of which average duty cycle in a total period of the first period and the second period is same as a set duty cycle, and further, may turn on the second element while the first element is turned off in the second period.

A second aspect disclosed herein is the motor control device as in the first aspect, that may further be configured to: when the corrected duty cycle is less than the threshold value, perform the average PWM control over an entire period in which the motor is driven; and when the corrected duty cycle is greater than or equal to the threshold value, perform the average PWM control until a third element which is different from the on-selected first element, that is one of the upper arm element and lower arm element, is turned off, and perform control with a 100% duty cycle during a period from when the third element is turned off until when the first element is turned off.

A third aspect disclosed herein is the motor control device as in the first or second aspect, that may further be configured to repeat, upon setting the correction duty ratio: comparing the threshold value and a $n^{th}$ corrected duty cycle of the second period when the first period spans over n carrier cycles; and when the $n^{th}$ corrected duty cycle is greater than the threshold value, calculating a $n+1^{th}$ corrected duty cycle of the second period when the first period spans over n+1 carrier cycles (where n≥2 and n is an integer).

Advantageous Effects of Invention

According to the first aspect, the complementary PWM control can be performed even in the case in which the duty cycle of the first element is too large for the conventional configuration to perform the complementary PWM control. Specifically, when the complementary PWM control is to be performed, in order to prevent first and second elements (such as the transistors UH, UL) from simultaneously being turned on, the second element is not turned on immediately after the first element is turned off and also not turned on immediately before a subsequent turn-on timing of the first element within a period during which the first element is maintained off. That is, periods during which both the first and second elements are turned off (dead time) need to be provided. In the conventional configuration, only the PWM control was performed without performing the complementary PWM control because such a dead time could not be secured when the duty cycle of the first element increases (exceeds the threshold value).

According to the first aspect, a duration of the time during which the first element is turned on is extended without changing a ratio of an on-time and an off-time (duty cycle) of the first element (by keeping the first element turned on in the first period over several carrier cycles as originally set), and a duration of the time during which the first element is turned off in the second period is also extended. That is, the first element is switched by the average PWM control. As a result of this, even in the case in which the duty cycle of the first element is at such a value too large to perform the complementary PWM control, a long off-time for the first element is secured and thus the second element can be switched by the complementary PWM control. That is, by performing the complementary PWM control during the second period within an average PWM control period, the complementary PWM control can be performed even when the duty cycle of the first element is in a range greater than the duty cycle with which the conventional configuration can perform the complementary PWM control. As a result, as compared to the conventional configuration, heat generation in transistors can be suppressed. The duty command value is a time from a timing when the first element is turned on to a timing when the second element is turned on. As the duty cycle of the first element increases, a time from when the first element is turned on to when it is turned off increases, and the duty command value also increases. Hereinbelow, control to perform the complementary PWM control during the second period within the average PWM control period will be termed complementary average PWM control.

According to the second aspect, the numbers of times the transistors are switched can be reduced. The heat generation can be suppressed by a reduction in a switching loss of the transistors, and also, current that flows in the motor can be suppressed from fluctuating.

According to the third aspect, the complementary average PWM control can be performed without excessively extending the first period (being the period during which the first element remains turned on). In other words, the first period having a minimum length to perform the complementary average PWM control can be set.

DESCRIPTION OF EMBODIMENTS (Inverter)

Figure 1:
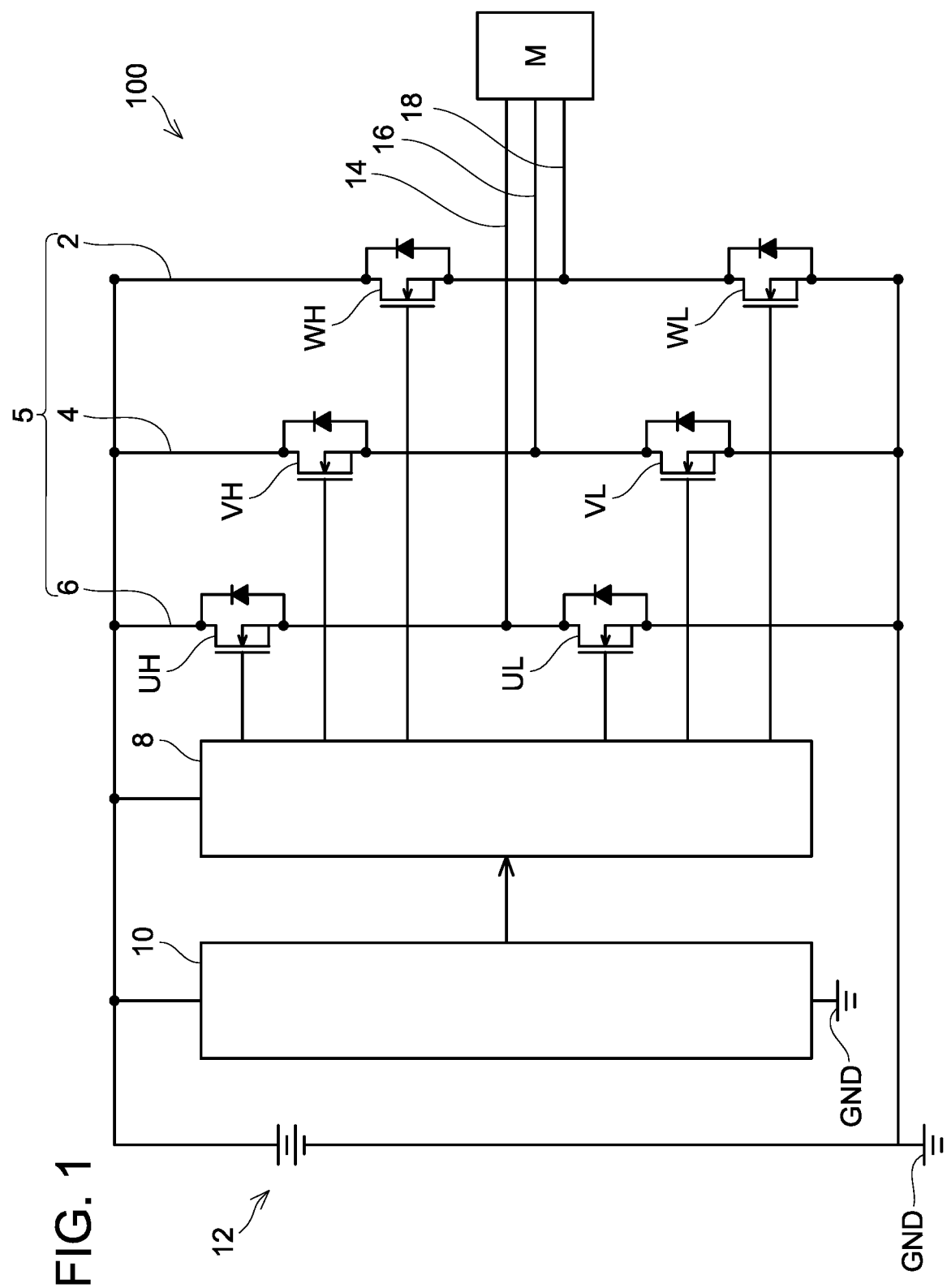
FIG. 1 shows a circuit diagram of an inverter.

An inverter 100 will be described with reference to FIG. 1. The inverter 100 is connected to a motor M, and is configured to supply drive current to the motor M. The inverter 100 includes a power supply 12, an inverter circuit 5 configured to change a frequency of the power supply 12, a gate control circuit 8 configured to switch on/off (perform switching) of transistors (UH, UL, VH, VL, WH, WL) constituting the inverter circuit 5, and a motor control device 10 configured to control the gate control circuit 8. The gate control circuit 8 and the motor control device 10 are connected to the power supply 12. Although not shown, the motor control device 10 includes a CPU and a memory. Further, signals from, such as, a circuit configured to detect a rotor position of the motor M and a circuit configured to detect current flowing in the motor M are inputted to the motor control device 10.

The inverter 100 is a three-phase inverter, and the inverter circuit 5 includes three switching element pairs (U-phase switching element pair 6, V-phase switching element pair 4, W-phase switching element pair 2). The inverter circuit 5 may also be termed a bridge circuit. Each of the switching element pairs 2, 4, 6 is connected to the power supply 12, and the switching element pairs 2, 4, 6 are connected in parallel to each other. The switching element pairs 2, 4, 6 each include an upper arm element (corresponding one of the transistors UH, VH, WH) connected to the high-voltage side of the power supply 12 and the lower arm element (corresponding one of the transistors UL, VL, WL) connected in series with its corresponding upper arm element and connected to a low-voltage side of the power supply 12.

The transistor UH and the transistor UL are connected in series, the transistor VH and the transistor VL are connected in series, and the transistor WH and the transistor WL are connected in series. Three wirings 14, 16, 18 are connected between the respective pairs of the upper and lower arm elements. The wirings 14, 16, 18 are connected to terminals of the motor M. Specifically, the wiring 14 is connected to an intermediate portion between the transistor UH and the transistor UL, the wiring 16 is connected to an intermediate portion between the transistor VH and the transistor VL, and the wiring 18 is connected to an intermediate portion between the transistor WH and the transistor WL. The motor control device 10 is configured to drive the motor M by switching the transistors UH, VH, WH, UL, VL, WL and changing current flowing in the wirings 14, 16, 18. Gates of the transistors UH, VH, WH, UL, VL, WL are connected to the gate control circuit 8 via gate wirings (not shown).

(Switching State of Inverter Circuit)

Figure 2:
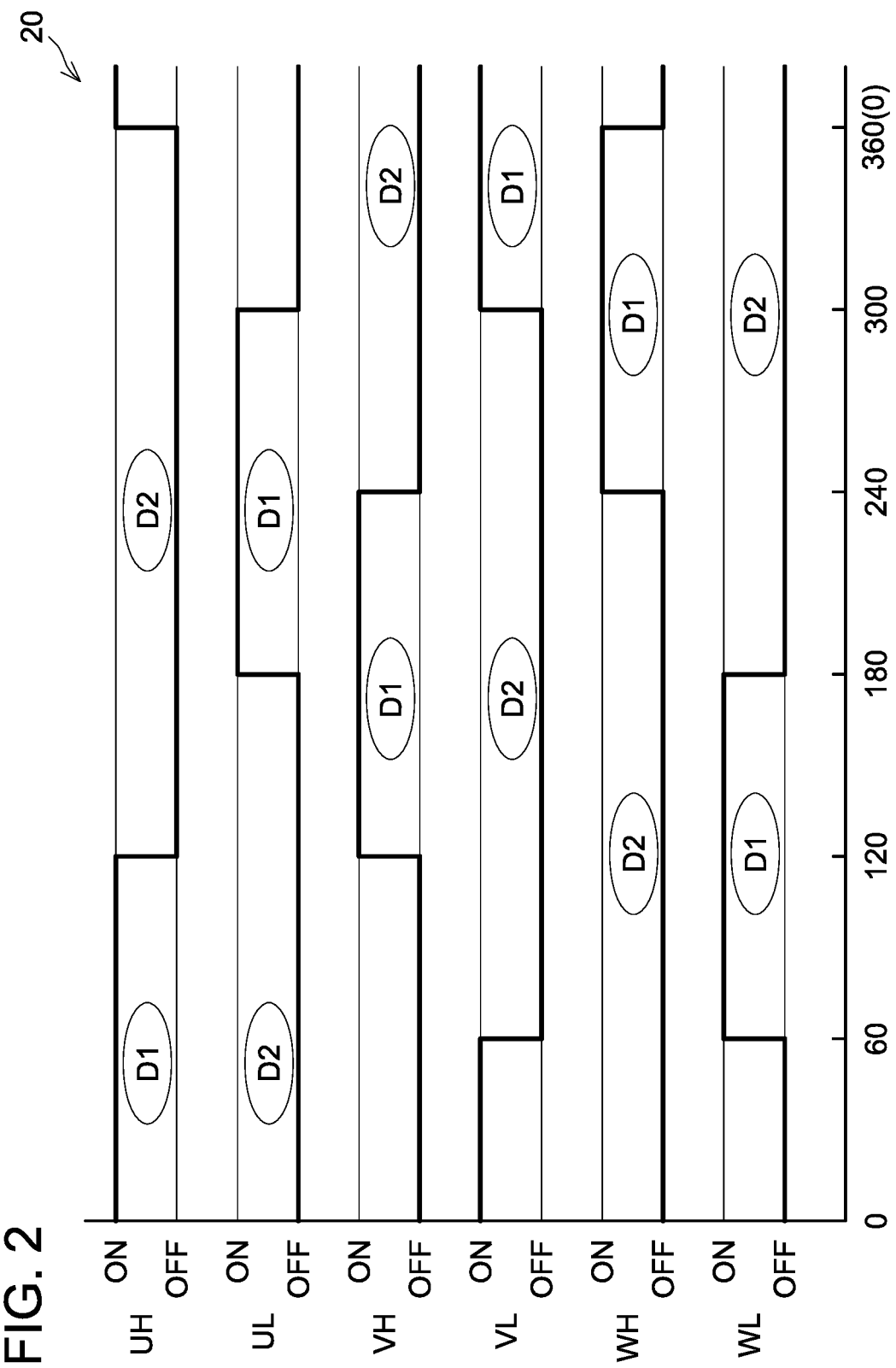
FIG. 2 shows a timing table of the inverter when a motor is driven.

Switching states of the respective transistors upon driving the motor M will be described with reference to FIG. 2. A timing table 20 shows a rotation angle of the motor M (rotor phase) and the switching states (on/off states) of the respective transistors. Upon when the motor M is driven, the motor control device 10 controls the gate control circuit 8 to on-select one of the upper arm elements (transistors UH, VH, WH), on-selects one of the lower arm elements (transistors UL, VL, WL) that is not connected in series with the on-selected upper arm element, and thereby supplies the current to the motor M. For example, the transistor UH and the transistor VL are on-selected while the rotation angle is 0 to 60 degrees, the transistor UH and the transistor WL are on-selected while the rotation angle is 60 to 120 degrees, and the transistor VH and the transistor WL are on-selected while the rotation angle is 120 to 180 degrees. The transistors remain turned on while the motor M (rotor) rotates 120 degrees, and a combination of the upper and lower arm elements that are turned on changes each time the motor M rotates 60 degrees.

For example while the rotation angle is 0 to 60 degrees, the motor control device 10 is configured to adjust rotation speed of the motor M by switching the transistor UH based on a duty cycle. On the other hand, the transistor VL is maintained in its on-state while the rotation angle is 0 to 60 degrees. During this period in which the rotation angle is 0 to 60 degrees, the transistor UH is an example of the first element. While the rotation angle is 60 to 360 degrees as well, the motor control device 10 switches one of the two transistors that are on-selected based on the duty cycle. That is, the motor control device 10 adjusts the rotation speed of the motor M by performing PWM control. In FIG. 2, for each transistor switched based on the duty cycle (transistor actuated under the PWM control), a period during which it is actuated under the PWM control is indicated as "D1". Each of the transistors given "D1" is an example of the first element in its corresponding period (rotation angle) indicated as "D1".

The motor control device 10 further turns on the transistor (the transistor UL in the case in which the rotation angle is 0 to 60 degrees) connected in series with the transistor switched based on the duty cycle (first element) for a predetermined time while the first element is turned off. The transistor UL is an example of the second element in this period in which the rotation angle is 0 to 60 degrees. The motor control device 10 controls the respective transistors such that complementary PWM control is performed while the motor M is driven. In FIG. 2, the second element in each rotation angle and a period during which the second element operates under the complementary PWM control are indicated by "D2". The motor control device 10 does not perform the complementary PWM control at all times. It may not perform the complementary PWM control and/or the PWM control depending on the duty cycle of the first element. Conditions under which the motor control device 10 performs the complementary PWM control and the PWM control will be described later.

(Explanation on Complementary PWM Control)

Figure 3:
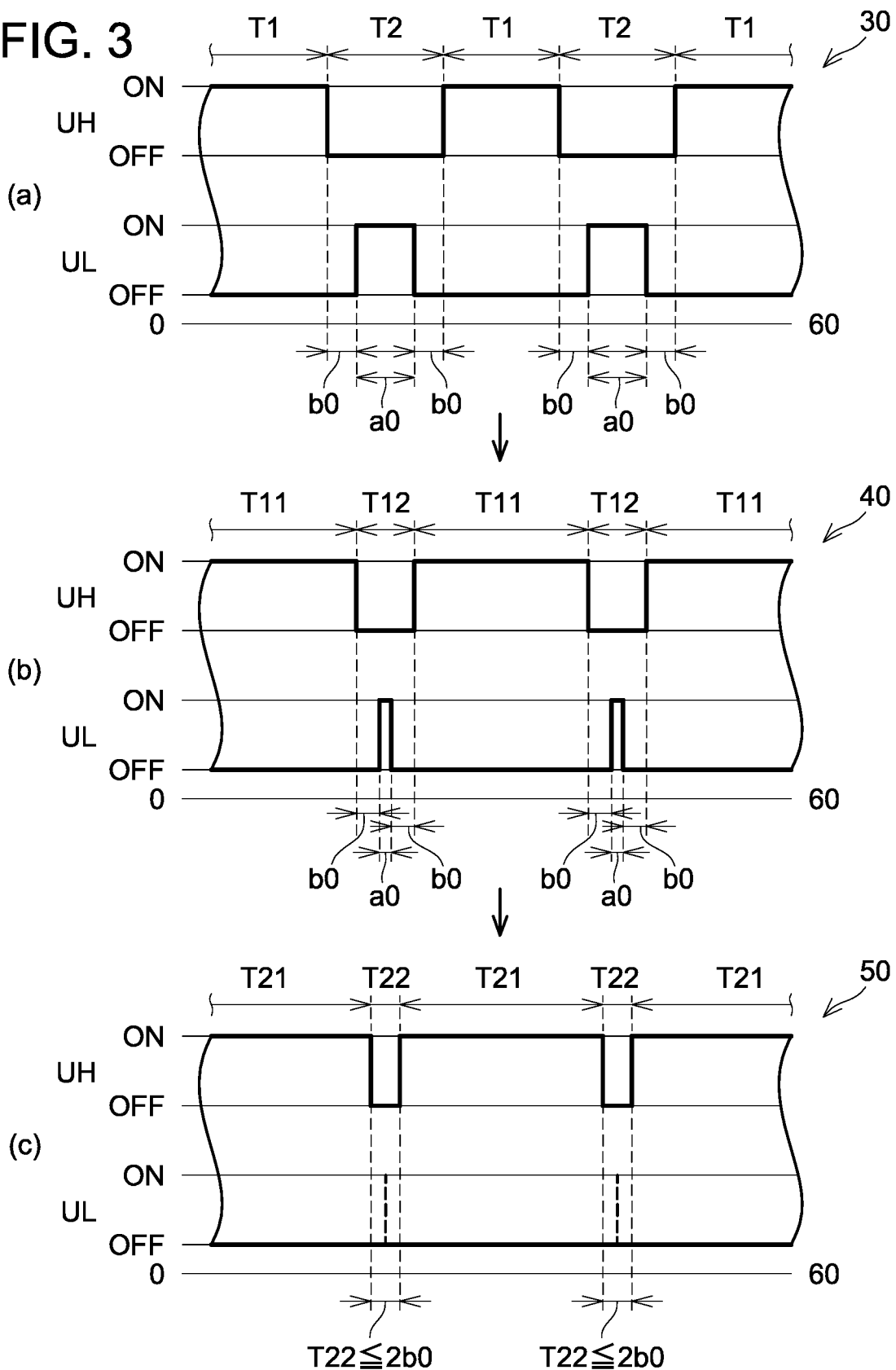
FIG. 3 shows diagrams explaining complementary PWM control.

FIG. 3 shows the switching states of the transistor UH (first element) and the transistor UL (second element) while the rotation angle is 0 to 60 degrees (a part of the timing table). A duty cycle of the transistor UH is different among (a) to (c) in FIG. 3. FIG. 3 shows a part of the switching states of the transistors UH, UL in the period during which the rotation angle is 0 to 60 degrees. In actuality, waveforms shown in FIG. 3 repeatedly appear while the rotation angle is 0 to 60 degrees. In a timing table 30 shown in (a), the transistor UH repeats an operation of being turned on for a time T1 and turned off for a time T2. That is, the duty cycle of the transistor UH is "time T1/(time T1+time T2)×100%". The transistor UL is turned on after a time b0 elapses since when the transistor UH is turned off, and is turned off after remaining turned on for a time a0 (which is time b0 before the timing when the transistor UH is turned on). That is, periods during which both transistors are off (time b0) are secured in order to avoid the state in which the transistor UH and the transistor UL are turned on simultaneously. The time b0 is called a dead time.

In a timing table 40 shown in (b), the duty cycle of the transistor UH is increased to "time T11/(time T11+time T12)×100%" as compared to the timing table 30. Even though the duty cycle of the transistor UH is increased, the dead time (time b0) remains unchanged. Due to this, as compared to the on-time of the transistor UL (time a0) in the timing table 30, the on-time (time a1) becomes shorter. When the duty cycle of the transistor UH increases, the time from when the transistor UH is turned on until when the transistor UL is turned on also becomes longer. The motor control device 10 is configured to determine a timing to turn on the transistor UL (duty command value) based on the duty cycle of the transistor UH and the length of the dead time. When the duty cycle of the transistor UH increases, the duty command value for the transistor UL also increases. In the timing tables 30, 40, the transistor UH is actuated under the PWM control and the transistor UL is actuated under the complementary PWM control.

In a timing table 50 of (c), the duty cycle of the transistor UH is further increased, and the off-time of the transistor UH (time T22) is less than or equal to the dead time (time T22≤2×b0). Due to this, if the duty cycle of the transistor UH is increased to "time T21/(time T21+time T22)×100%", the transistor UL cannot be turned on within the period during which the transistor UH is turned off (time T22). That is, in conventional motor control devices, the complementary PWM control cannot be performed when the duty cycle of the transistor UH becomes too large. To the contrary, even when the duty cycle of the transistor UH increases to "time T21/(time T21+time T22)×100%", the motor control device 10 changes the timing table 50 and performs the complementary PWM control. Hereinbelow, control performed by the motor control device 10 when the duty cycle of the transistor UH becomes too large as in the timing table 50 will be described.

(Control Performed by Motor Control Device 10)

Figure 4:
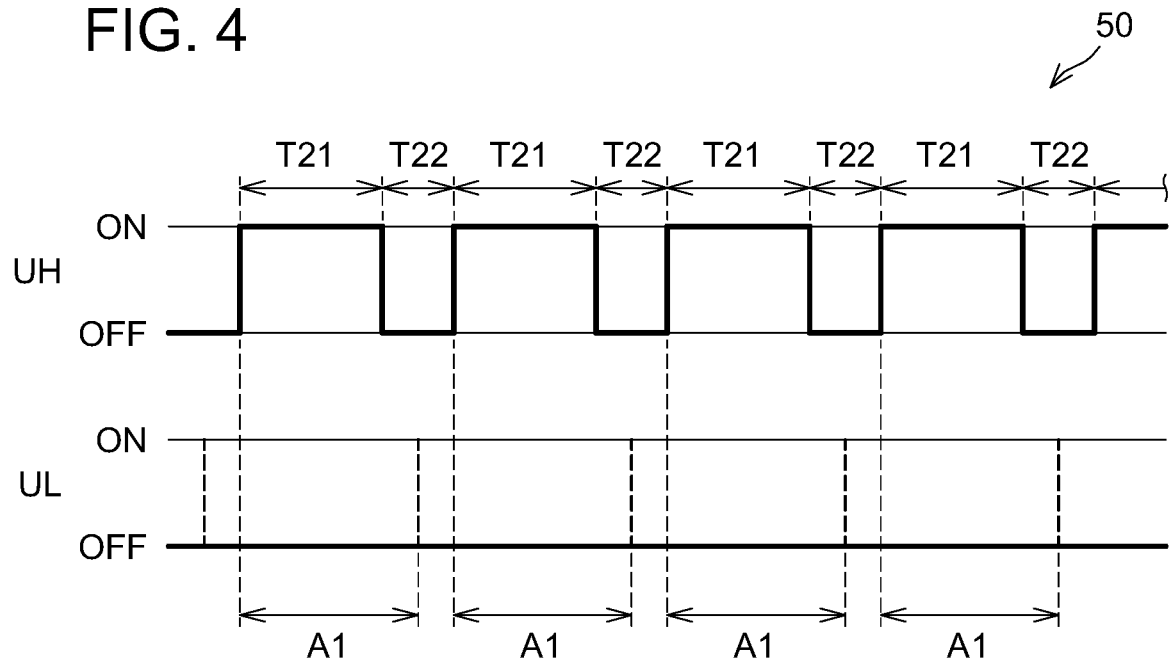
FIG. 4 shows a diagram explaining a relationship between a duty cycle and a duty command value.
Figure 5:
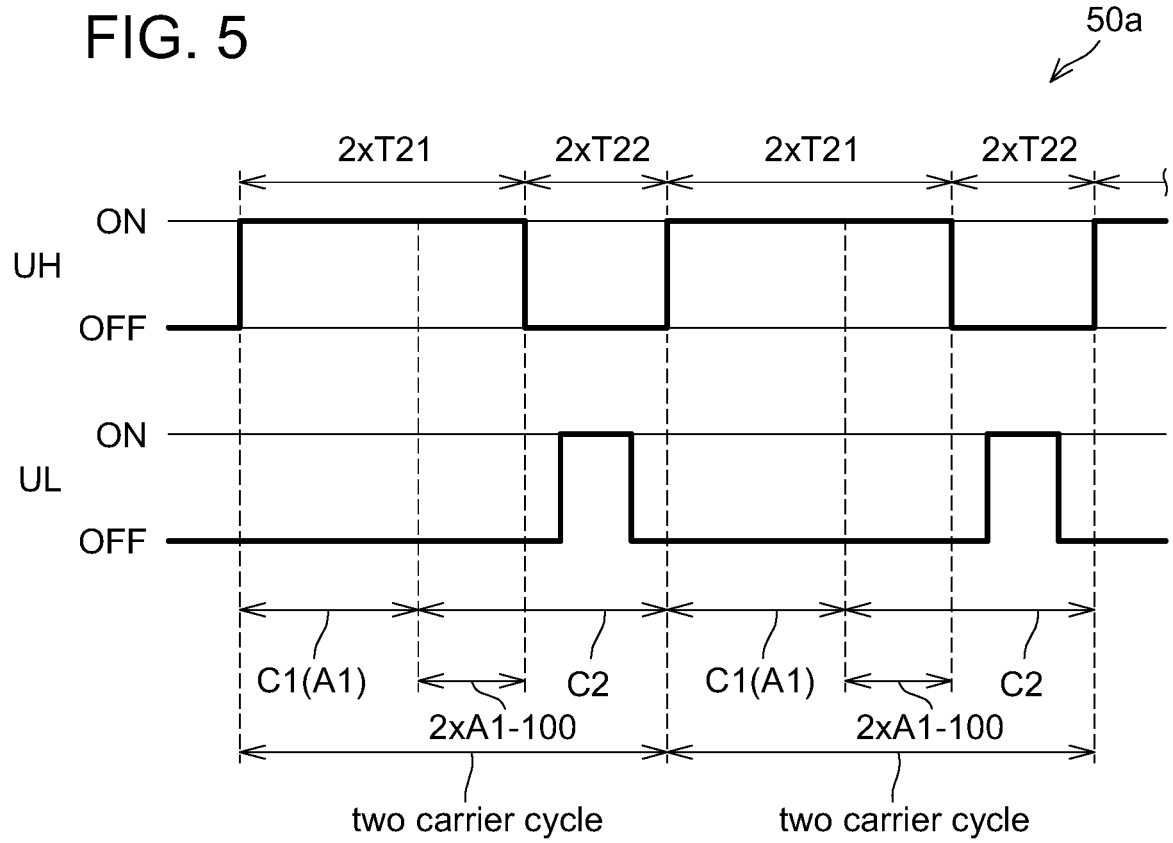
FIG. 5 shows a timing table in which a switching timing of an upper arm element is changed.
Figure 6:
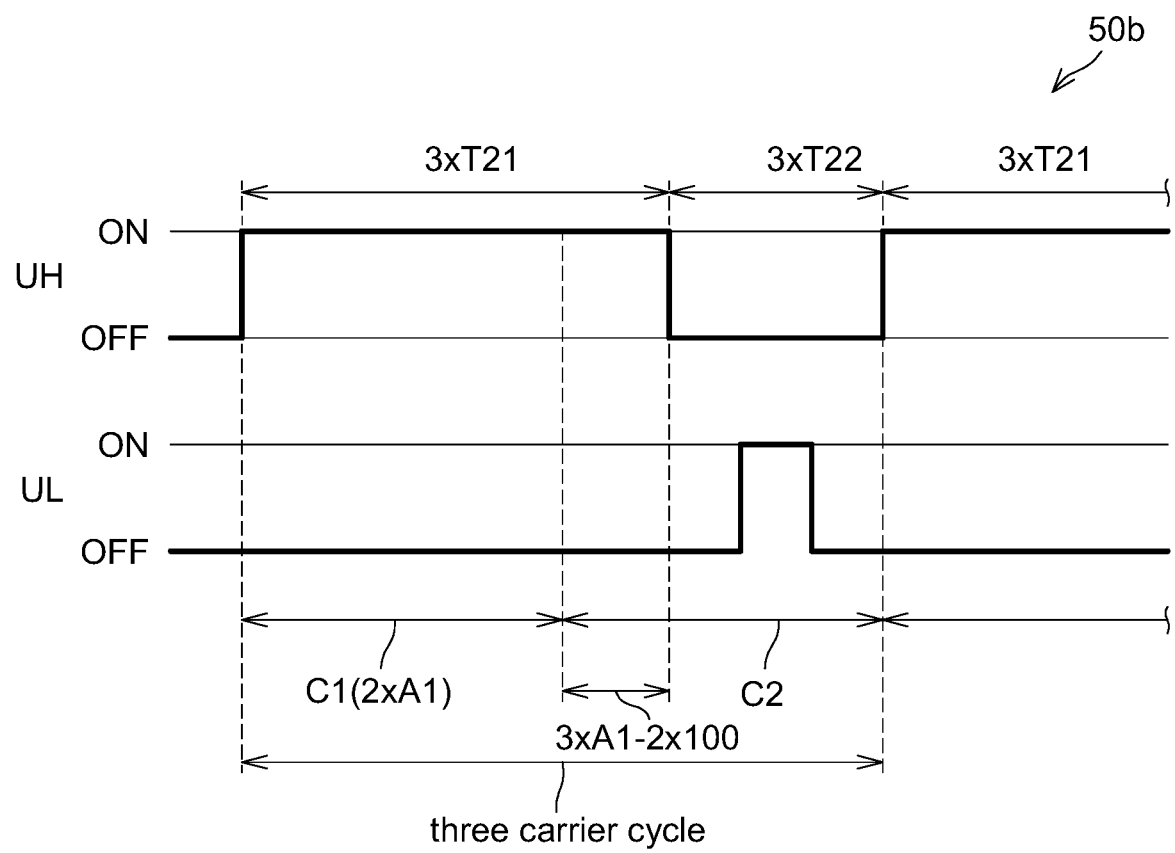
FIG. 6 shows a timing table in which the switching timing of the upper arm element is changed.

The control which the motor control device 10 performs upon when the duty cycle of the transistor UH increases as in the timing table 50 will be described with reference to FIGS. 4 to 6. FIG. 4 is a part of the timing table 50, and shows more periodic cycles than in FIG. 3(c). In order to clearly explain the control which the motor control device 10 performs, FIGS. 4 to 6 show the off-time of the transistor UH (time T22) longer than its actual length. As shown in FIG. 4, the motor control device 10 determines a duty command value A1 for turning on the transistor UL based on the duty cycle of the transistor UH and the dead time. However, since the duty cycle of the transistor UH is large and the duty command value A1 becomes greater than a preset threshold value, the transistor UL cannot be turned on. The "threshold value" is set to a value that is slightly smaller than the duty command value A1 which makes it impossible to turn on the transistor UL.

In the case in which the duty command value A1 is greater than the preset threshold value, the motor control device 10 performs a process to change a switching timing of the transistor UH. FIGS. 5 and 6 show a timing table 50a and a timing table 50b in which the switching timing of the transistor UH is changed. In the case in which the duty cycle of the transistor UH is small and the duty command value A1 is less than the set threshold value as in the timing table 30, the motor control device 10 performs the complementary PWM control without changing the switching timing of the transistor UH (see the timing table 20 in FIG. 2 as well).

The timing table 50a shown in FIG. 5 shows control that maintains the transistor UH turned on for twice the time T21 and thereafter maintains the transistor UH turned off for twice the time T22. That is, in the timing table 50a, the transistor UH is maintained on over two consecutive carrier cycles shown in the timing table 50 and is thereafter maintained off over two consecutive carrier cycles (see FIG. 4 as well). In other words, in the timing table 50a, the transistor UH is actuated with a corrected duty cycle in which the transistor UH remains turned on over a first period C1 (the transistor UH is actuated with a 100% duty cycle) and in a second period C2 the transistor US is turned off for a period longer than in the timing table 50 by a period during which it was not turned off in the first period C1.

In the timing table 50a, a length of the first period C1 (carrier cycle of the first period C1) is the same as the value of the duty command value A1. Further, a duty cycle of the second period C2 (corrected duty cycle) is (2×A1−100)%. As aforementioned, in the control of the timing table 50a, since the transistor UH is simply turned on over two consecutive carrier cycles and thereafter turned off over two consecutive carrier cycles, an average duty cycle of the transistor UH in a total period of the first period C1 and the second period C2 is the same as the duty cycle of the transistor UH in the timing table 50. Hereinbelow, control that actuates the transistor UL with different duty cycles in the first period C1 and the second period C2 while maintaining the average duty cycle to be the same as the set (original) duty cycle will be termed complementary average PWM control.

The timing table 50b shown in FIG. 6 shows control in which the transistor UH is turned on for three times the time T21 and thereafter the transistor UH is turned off for three times the time T22. In the timing table 50b, the length of the first period C1 is "2×A1" and the duty cycle of the second period C2 is (3×A1−2×100)%. The motor control device 10 may perform, in accordance with the value of the duty command value A, control so that the transistor UH is maintained on for n times the time T21 (where n>3 and n is an integer) and thereafter the transistor UH is maintained off for n times the time T22.

As shown in FIGS. 5 and 6, in the timing tables 50a, 50b, the off-time of the transistor UH in the second period C2 is set longer than in the timing table 50. Due to this, the transistor UL can be turned on during the period in which the transistor UH is off while the dead time is secured. In the case in which the duty command value A1 is greater than the preset threshold value, the motor control device 10 operates the transistor UH under the average PWM control, and turns on the transistor UL while securing sufficient off-periods (actuates the transistor UL under the complementary PWM control). Hereinbelow, control that actuates the lower arm element (transistor UL) under the complementary PWM control by actuating the upper arm element (transistor UH) under the average PWM control will be termed the complementary average PWM control. The motor control device 10 enables to actuate the transistor UL under the complementary PWM control (complementary average PWM control) by actuating the transistor UH under the average PWM control even in the case in which the duty cycle of the transistor UH is too large for the conventional configuration to perform the complementary PWM control.

Figure 7:
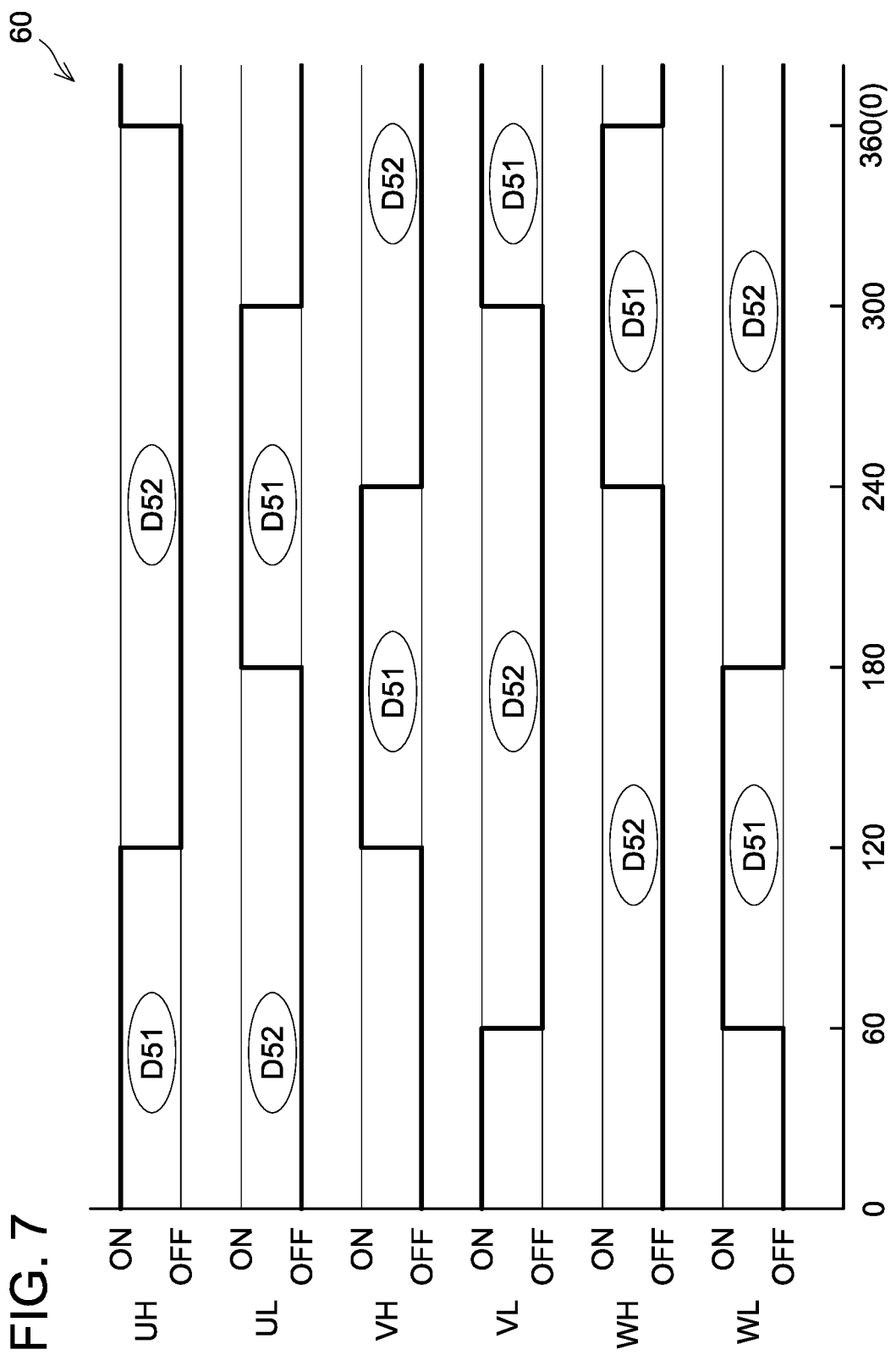
FIG. 7 shows a timing when complementary average PWM control is performed.
Figure 8:
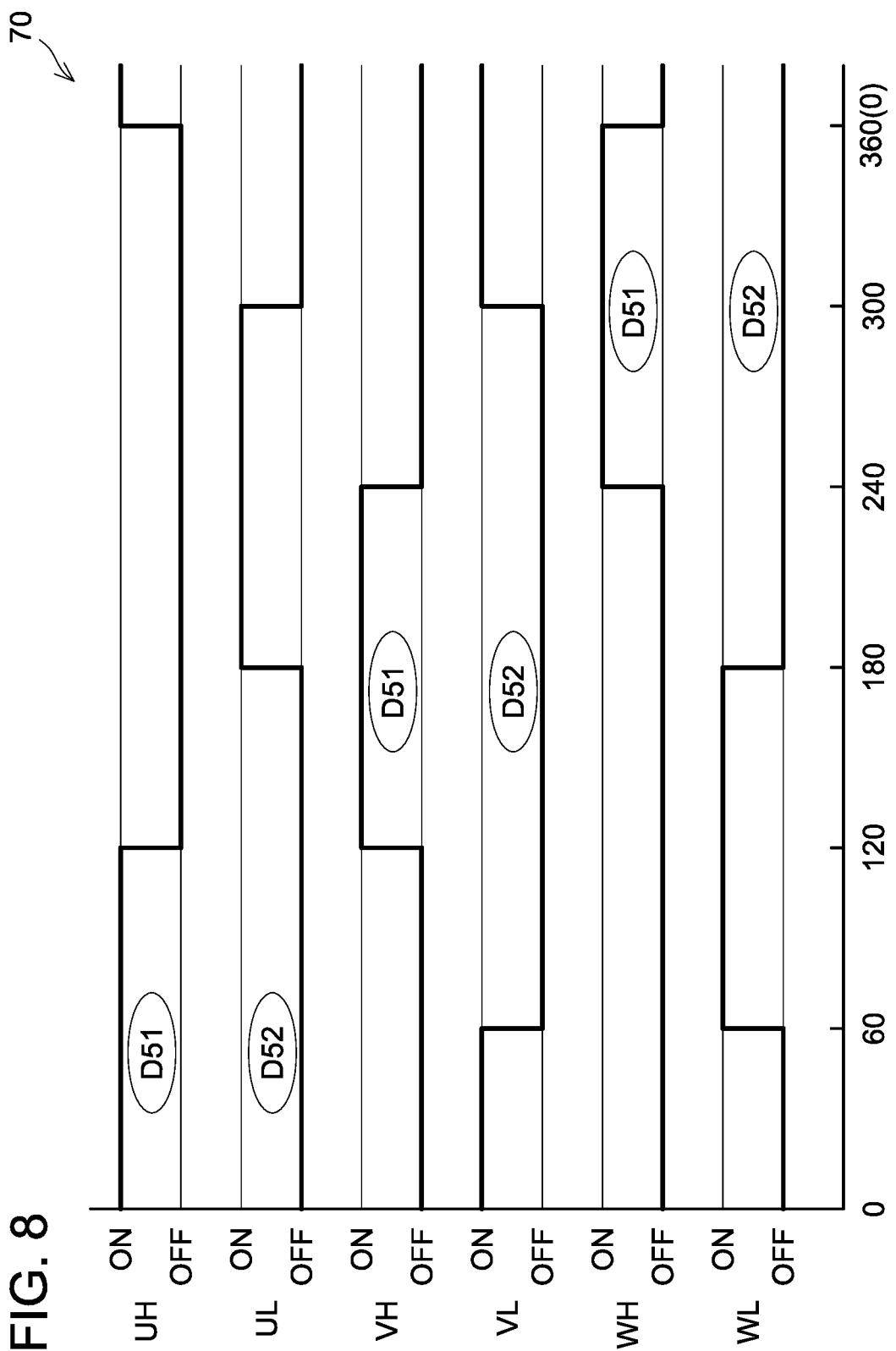
FIG. 8 shows a timing when the complementary average PWM control is performed.

FIGS. 7 and 8 show the rotation angle of the motor M (rotor phase) and the switching states (on/off states) of the respective transistors when the complementary average PWM control is performed (timing tables 60, 70). In the timing tables 60, 70, for each transistor actuated under the average PWM control, a period during which it is actuated under the average PWM control is indicated as "D51". Further, for each transistor actuated under the complementary PWM control (complementary average PWM control), a period during which it is actuated under the complementary PWM control (complementary average PWM control) is indicated as "D52". As in the timing table 60 shown in FIG. 7, by using the average PWM control and the complementary average PWM control, the transistor can be switched at the same timing as in the case in which a duty cycle of the transistor controlled under the PWM control is small and the duty command value A1 is less than the set threshold value (see FIG. 2 for comparison).

As in the timing table 70 shown in FIG. 8, the motor control device 10 may alternately set a period during which a transistor is actuated under the average PWM control (that is, a period performing the complementary average PWM control) and a period during which the transistor which the PWM control (average PWM control) is to be performed on is actuated with a 100% duty cycle (that is, a period in which the PWM control is not performed). For example, within a period during which the rotation angle is 0 to 120 degrees, the transistor UH is actuated under the average PWM control (over the period in which the rotation angle is 0 to 60 degrees) until the transistor VL, which is one of the transistor UH and the transistor VL that were on-selected and is not actuated under the average PWM control, is turned off. In a period from when the transistor VL is turned off until when the transistor UH is turned off (while the rotation angle is 60 to 120 degrees), the transistor UH is actuated with the 100% duty cycle. In this period during which the rotation angle is 0 to 120 degrees, the transistor VL is an example of the third element. Further, in a period during which the rotation angle is 120 to 240 degrees, the transistor WL is an example of the third element, and in a period during which the rotation angle is 240 to 360 degrees, the transistor UL is an example of the third element.

The timing table 70 alternates the control performing the average PWM control and the control not performing the PWM control nor the average PWM control every 60 degrees. Although the details will be described later, the control as in the timing table 70 is performed when the duty cycle of the on-selected transistor (transistor switched based on the duty cycle) is very large (that is, the duty command value A1 is very large).

(Arithmetic Process Performed by Motor Control Device)

Hereinbelow, an arithmetic process performed by the motor control device 10 will be described with reference to FIGS. 9 and 10 and flowcharts therein. In order to facilitate explanation of the flowcharts, the period in which the on-selected transistors are the transistor UH and the transistor VL (while the rotation angle is 0 to 60 degrees) will be exemplified. Further, FIGS. 4 to 8 may suitably be referred as needed.

Firstly, the duty command value A1 is determined based on the duty cycle of the transistor UH and the dead time for the case in which the complementary PWM control is performed (step S2, FIG. 4). Next, a determination is made on whether the duty command value A1 is greater than a threshold value TA1 (step S4). The threshold value TA1 is set based on a value smaller than a duty cycle with which the duty cycle that of the transistor UH cannot perform the complementary PWM control (as in the state of FIG. 3(c)). In the case in which the duty command value A1 is less than or equal to the threshold value TA1 (step S4: NO), the duty command value A1 is compared with a value (TA1−α1) set by subtracting switching hysteresis α1 of the transistor UH from the threshold value TA1, and a determination is made on whether the duty command value A1 is less than (TA1−α1) (step S12). That is, a determination is made on whether the dead time can be secured for sure.

In the case in which the duty command value A1 is greater than or equal to (TA1−α1) (step S12: NO), the process returns to step S2 and determines the duty command value A1 and compares the duty command value A1 with the threshold value TA1 (step S4). On the other hand, in the case in which the duty command value A1 is less than (TA1−α1)

(step S12: YES), the normal complementary PWM control is performed (step S14, FIG. 2).

In the case in which the duty command value A1 is greater than the threshold value TA1, the transistor UL cannot be turned on (the complementary PWM control cannot be performed) if the transistor UH is switched under the normal PWM control. Due to this, in the case in which the duty command value A1 is greater than the threshold value TA1 in step S4 (step S4: YES), the process proceeds to step S6 and calculates the condition for driving the transistor UH under the average PWM control. Specifically, a duty cycle (corrected duty cycle) C3 of the second period C2 is calculated (step S6).

Figure 10:
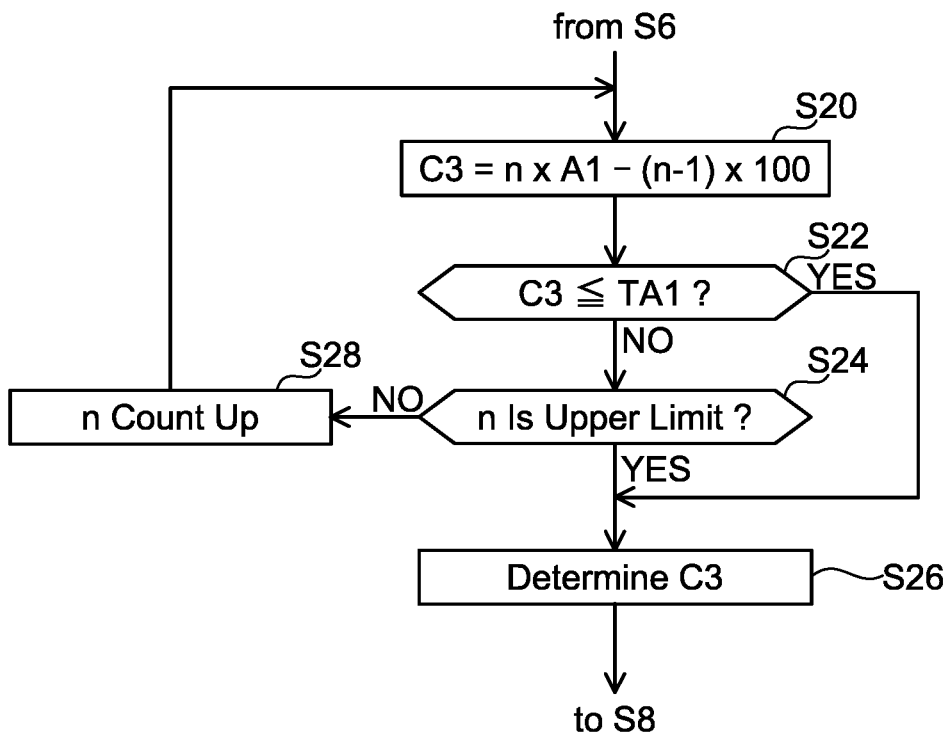
FIG. 10 shows a flowchart of control which the motor control device performs.

The duty cycle C3 is calculated by a procedure shown in FIG. 10. Firstly, the duty cycle C3 of the second period C2 is calculated by using an equation "C3={n×A1−(n−1)}× 100" shown in step S20. In a first arithmetic process, the duty cycle C3 of the second period C2 in the case in which "n=2", that is, the case in which the first period C1 and the second period C2 are each set using two carrier cycles is calculated (see FIG. 5 as well). Next, the process proceeds to step S22 and compares the duty cycle C3 with the threshold value TA1. In the case in which the duty cycle C3 is less than or equal to the threshold value TA1 (step S22: YES), the duty cycle C3 is determined (step S26).

In the case in which the duty cycle C3 is greater than the threshold value TA1 in step S22 (step S22: NO), the process proceeds to step S24 and determines whether the value "n" has reached its upper limit. That is, a determination is made on whether the number of carrier cycles used to compose each of the first period C1 and the second period C2 has reached a preset upper limit value. In the case in which the value "n" has not reached its upper limit (step S24: NO), the process of incrementing the value "n" (that is, adding "1" to n) in step S28, the process of returning to the process of step S20 and calculating the duty cycle C3, and the process of comparing the duty cycle C3 with the threshold value TA1 (step S22) are repeated until the value of "n" reaches its upper limit.

On the other hand, in the case in which the value "n" has reached its upper limit (step S24: YES), the process proceeds to step S26 and determines the duty cycle C3 even when the calculated duty cycle C3 is greater than the threshold value TA1 (step S22: NO). For example, in the case in which the duty cycle of the transistor UH is extremely large, the duty cycle C3 may not become less than or equal to the threshold value TA1 even if the calculation of the duty cycle C3 is repeated. There also may be a case in which the arithmetic processing needs be repeated over numbers of times before the duty cycle C3 becomes less than or equal to the threshold value TA1. By setting the upper limit of "n", processing load on the motor control device 10 can be reduced.

After having determined the duty cycle C3, the process proceeds to step S8, and compares the determined duty cycle C3 with the threshold value TA1. In the case in which the duty cycle C3 is less than or equal to the threshold value TA1 (step S8: YES), the process proceeds to step S10, and the average PWM control is performed (the complementary average PWM control is performed) over an entire period in which the motor M is driven as shown in FIG. 7. On the other hand, in the case in which the duty cycle C3 is greater than the threshold value TA1 (step S8: NO), the process proceeds to step S16, and alternately sets the period in which the average PWM control is performed (the complementary average PWM control is performed) and the period in which the transistor UH is controlled with the 100% duty cycle (the PWM control is not performed) as shown in FIG. 8. That is, in the case in which the duty cycle C3, which is a value smaller than the duty command value A1, is still greater than the threshold value TA1, the period in which the transistor UH is switched under the average PWM control and the period in which the transistor UH is controlled with the 100% duty cycle (the PWM control is not performed) are alternately set every 60 degrees in order to reduce the numbers of times the transistors are switched.

(Other Embodiments)

Figure 9:
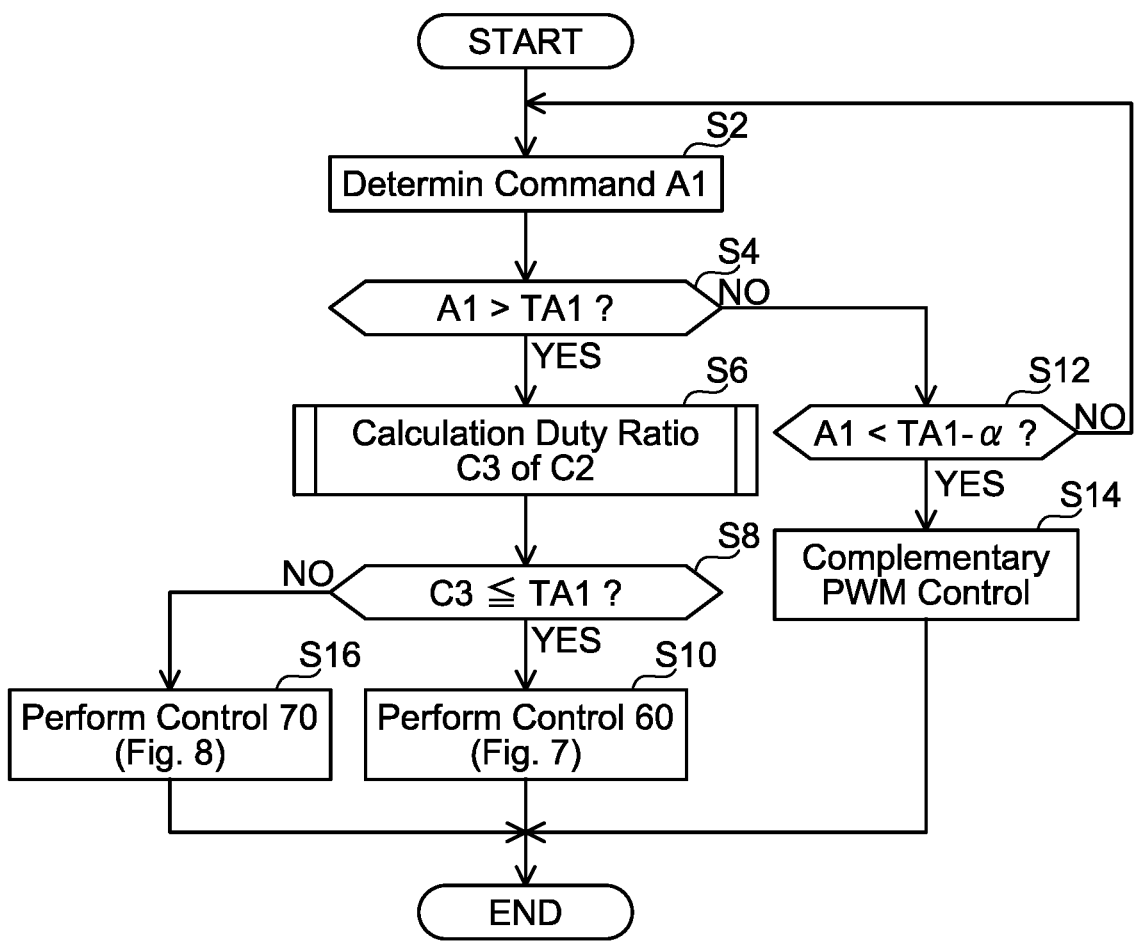
FIG. 9 shows a flowchart of control which a motor control device performs.
Figure 11:
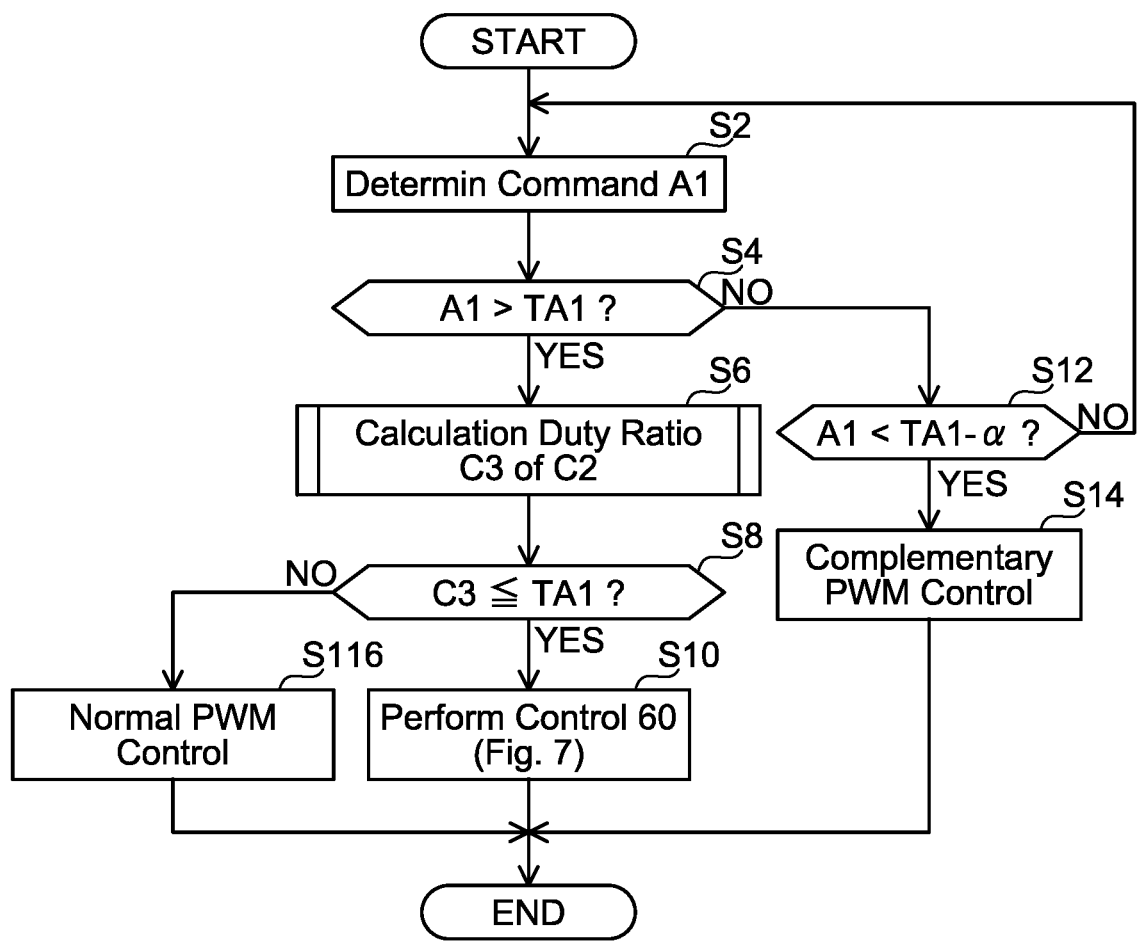
FIG. 11 shows a flowchart of control which the motor control device performs.

In the flow described in FIGS. 9 and 10, the example in which the determined duty cycle C3 and the threshold value TA1 are compared, and the period in which the transistor UH is switched under the average PWM control and the period in which the transistor UH is controlled with the 100% duty cycle are alternately set every 60 degrees in the case of "C3>TA1" (step S8: NO) was explained. However, as shown in FIG. 11, the normal PWM control (with no complementary PWM control) may be performed in the case of "C3>TA1" (step S8: NO).

Further, in performing the arithmetic processing to determine the duty cycle C3, the calculation of the duty cycle C3 may be repeated until "C3≤TA1" is satisfied without limiting the number of the carrier cycles used for composing the first period C1 and the second period C2 (without performing step S24).

In the above embodiments, examples that set the second period (period in which the second element is actuated under the complementary average PWM control) after the first period (period in which the first element is actuated with the 100% duty cycle) were explained. However, the first period may be set after the second period.

Specific examples of the present disclosure have been described in detail however, these are mere exemplary indications and thus do not limit the scope of the claims. The art described in the claims include modifications and variations of the specific examples presented above. The technical elements explained in the present specification or drawings provide technical utility either independently or through various combinations. The present disclosure is not limited to the combinations described at the time the claims are filed. Further, the purpose of the examples illustrated by the present specification or drawings is to satisfy multiple objectives simultaneously, and satisfying any one of those objectives gives technical utility to the present disclosure.

The invention claimed is:

1. A motor control device configured to drive a motor connected to an inverter, wherein
the inverter comprises a plurality of switching element pairs, each of which is constituted of an upper arm element and a lower arm element connected to each other in series, the upper arm element being connected to a high voltage side of a power supply and the lower arm element being connected to a low voltage side of the power supply,
the motor control device is configured to:
perform PWM control in which a first element that is on-selected for energizing the motor is switched based on a duty cycle, the first element being one of the upper arm element and the lower arm element;
determine a duty command value for switching a second element so that the motor control device performs complementary PWM control in which the second element connected in series with the first element is turned on for a predetermined time during an off-period of the first element, and perform the complementary PWM control when the determined duty command value is less than or equal to a threshold value;

when the determined duty command value is greater than the threshold value, set a first period and a second period for the first element, the first period being a period in which the first element remains turned on over a plurality of carrier cycles, the second period being a period for performing control with a corrected duty cycle in which the first element is turned off for a period extended by a period during which the first element is not turned off in the first period, and perform average PWM control of which average duty cycle in a total period of the first period and the second period is same as a set duty cycle; and turn on the second element while the first element is turned off in the second period.

2. The motor control device according to claim 1, further configured to:

when the corrected duty cycle is less than the threshold value, perform the average PWM control over an entire period in which the motor is driven; and when the corrected duty cycle is greater than or equal to the threshold value, perform the average PWM control until a third element which is different from the on-selected first element, that is one of the upper arm element and lower arm element, is turned off, and perform control with a 100% duty cycle during a period from when the third element is turned off until when the first element is turned off.

3. The motor control device according to claim 2, further configured to repeat, upon setting the correction duty ratio:

comparing the threshold value and a $n^{th}$ corrected duty cycle of the second period when the first period spans over n carrier cycles; and when the $n^{th}$ corrected duty cycle is greater than the threshold value, calculating a $n+1^{th}$ corrected duty cycle of the second period when the first period spans over n+1 carrier cycles (where n≥2 and n is an integer).

4. The motor control device according to claim 1, further configured to repeat, upon setting the correction duty ratio:

comparing the threshold value and a $n^{th}$ corrected duty cycle of the second period when the first period spans over n carrier cycles; and when the $n^{th}$ corrected duty cycle is greater than the threshold value, calculating a $n+1^{th}$ corrected duty cycle of the second period when the first period spans over n+1 carrier cycles (where n≥2 and n is an integer).

* * * * *